Oct. 11, 1960

J. H. FRANKFORT 2,955,549

ATOMIC EXPLOSION SHELTER

Filed May 4, 1955

INVENTOR
Jacob Harry Frankfort
BY
J. William Carson
ATTORNEY

Oct. 11, 1960  J. H. FRANKFORT  2,955,549
ATOMIC EXPLOSION SHELTER
Filed May 4, 1955  3 Sheets-Sheet 2
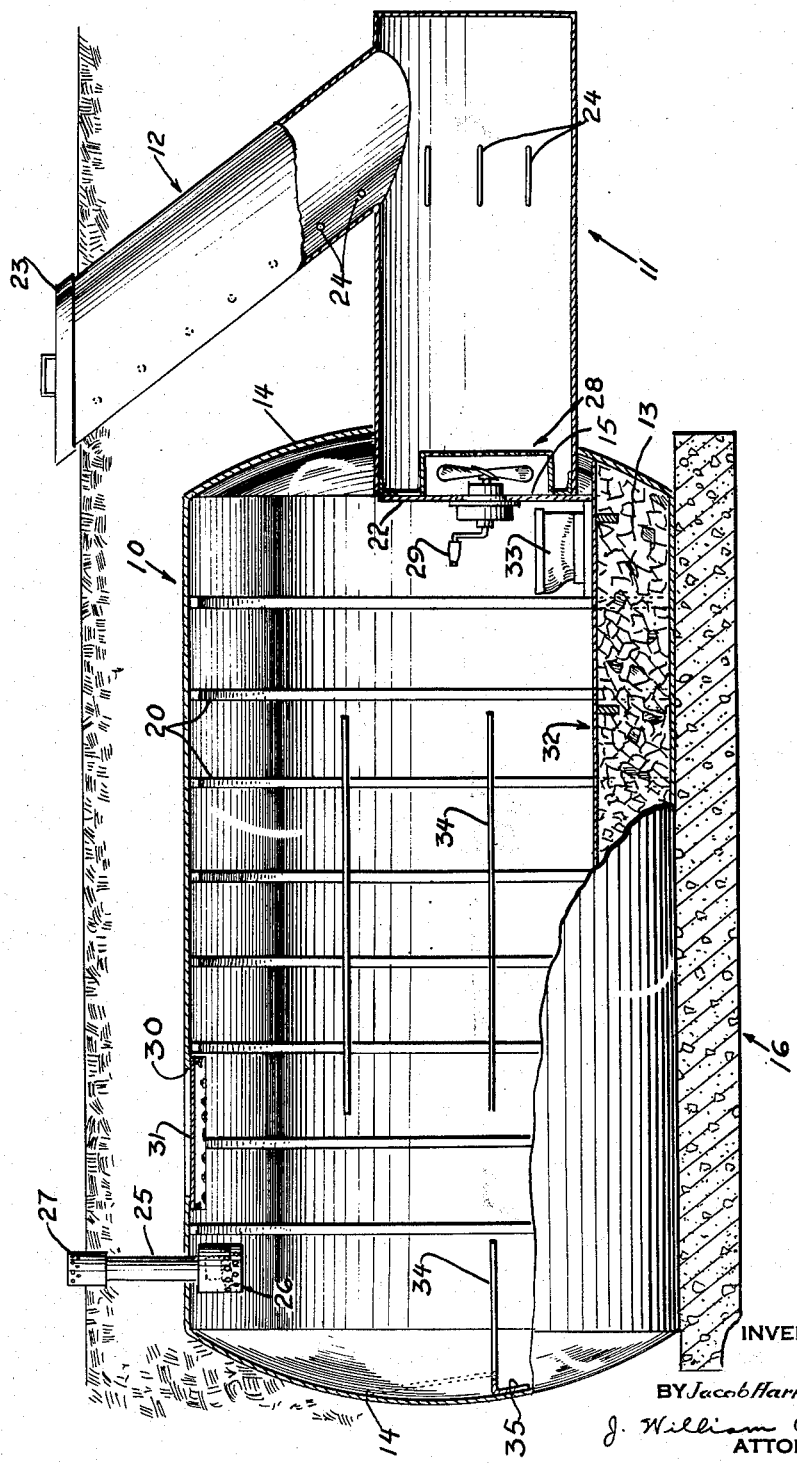

Oct. 11, 1960  J. H. FRANKFORT  2,955,549
ATOMIC EXPLOSION SHELTER
Filed May 4, 1955  3 Sheets-Sheet 3
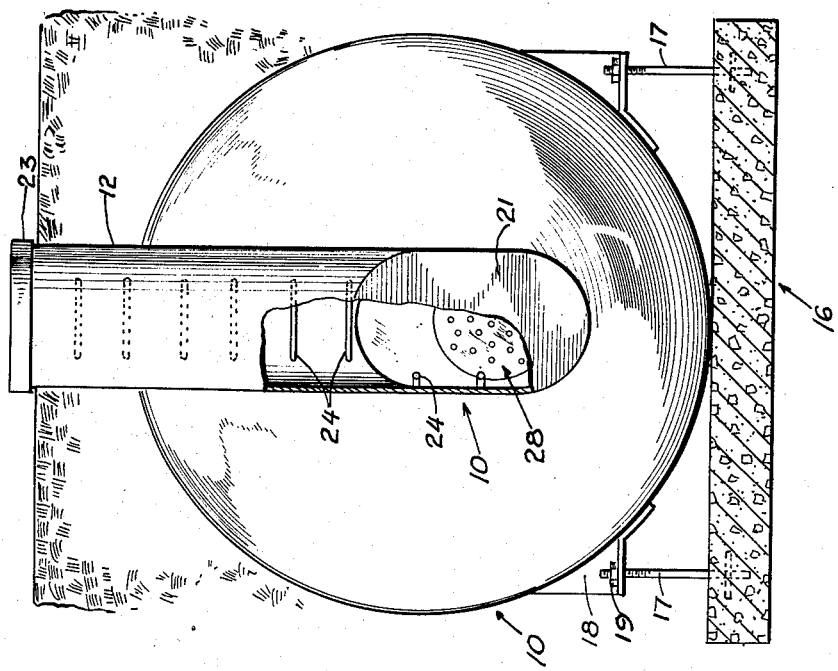
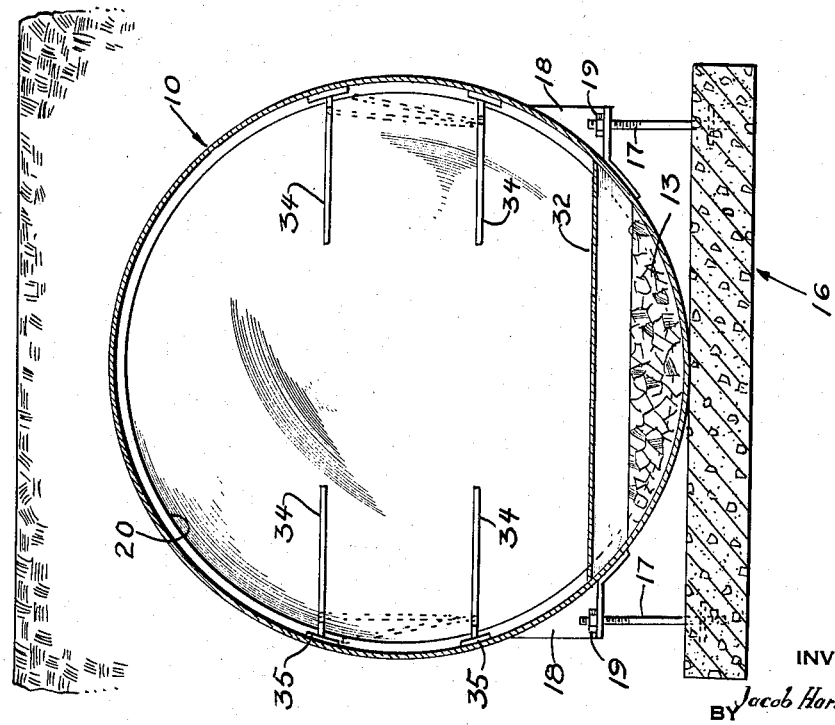
INVENTOR
Jacob Harry Frankfort
BY
J. William Carson
ATTORNEY United States Patent Office 2,955,549
Patented Oct. 11, 1960

2,955,549
ATOMIC EXPLOSION SHELTER
Jacob Harry Frankfort, Rockville Centre, N.Y., assignor to Associated Nucleonics, Inc., a corporation of New York Filed May 4, 1955, Ser. No. 506,030
4 Claims. (Cl. 109—1)

The present invention relates to buildings and structures, and, more particularly, to an underground shelter in which human beings can survive the heat of atomic explosions and are protected against nuclear radiations resulting from fall out.

The possibility of attack with atomic weapons has been of great concern and many proposals have been made to safeguard human beings against the effects thereof. It has been suggested that persons in the attacked area remain in cellars, or in other underground spaces until the danger has passed. However, these shelters will not provide adequate protection against harmful nuclear radiations which may endure for several days, because such refuges do not exclude the radiations and/or are not equipped for filtering harmful particles from the air supply, and are not designed or otherwise equipped to properly take care of such emergencies for considerable duration. Other suggestions have been made which involved specially constructed buildings or mass shelters or modifying existing structures, but the cost thereof makes such protection unfeasible.

Accordingly, an object of the present invention is to provide a shelter in which human beings can survive atomic attacks which is simple and economical in construction, and is compact in arrangement, but yet will adequately house the average family for as long as three days or more.

Another object is to provide such a shelter which is constructed and arranged for being buried underground close to the home, whereby the earth surrounding the same serves as a nuclear radiation shield.

Another object is to provide such a shelter which is equipped with a ventilating system for excluding radioactive particles.

Another object is to provide such a shelter which can withstand the pressure of the ground thereon as well as the blast of an atomic explosion nearby.

Another object is to provide such a shelter which is securely anchored in the ground to prevent dislodgement thereof by the buoyant effects of subterranean seepages.

Another object is to provide such a shelter wherein provision is made for access thereto while maintaining the main chamber fully shielded.

Another object is to provide such a shelter having an emergency exit which is normally fully shielded from nuclear radiations.

Another object is to provide such a shelter wherein provision is made for dissipating the body heat of human beings into the surrounding ground.

A further object is to provide such a shelter which can be readily prefabricated and fully equipped for burying in the ground without being conspicuous or rendering the premises unsightly.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a shelter which comprises a heat conductive tank constructed and arranged for burying the same underground a sufficient depth to shield the same from heat and nuclear radiations and for withstanding the blast of a nearby atomic explosion as well as the ground pressure thereon, entrance means in communication with an end wall opening of the tank including an upwardly projecting tube formed with a manhole above the level of the tank, a cover for the manhole, and a conduit extending to or above ground level, means for supplying atmospheric air through the conduit to the tank, and filter means for removing radioactive particles from the supplied air.

In a preferred arangement of this shelter, the entrance means include a labyrinth passage wherein ladder means are provided, the tank has internal rings for reinforcing the same, a concrete foundation anchors the tank in the ground, an emergency exit opening is sealed by a closure removable at the interior of the tank, and adequate sleeping and eating facilities in the form of foldably supported bunks and food storage means are provided in the tank.

A preferred embodiment of the invention has been chosen for purposes of illustration and description, and is shown in the accompanying drawings, forming a part of the specification, wherein:

Fig. 2 is a sectional view taken along the line 2—2 on Fig. 1, showing the shelter buried and anchored in the ground.

Fig. 3 is a sectional view taken along the line 3—3 on Fig. 1.

Fig. 4 is an end view of the shelter as seen from the right in Fig. 1.

Figure 1:
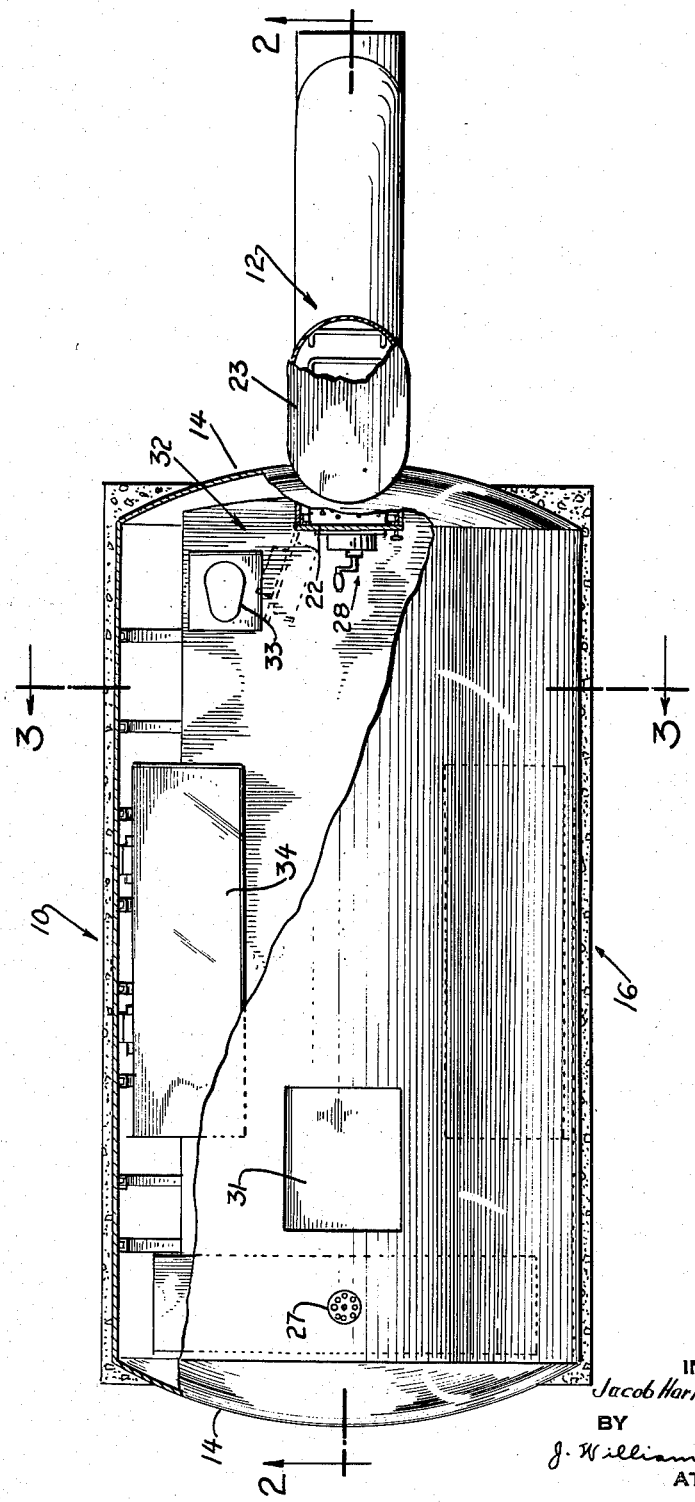
Fig. 1 is a top plan of a shelter in accordance with the present invention, with certain details at the interior thereof being shown in broken lines.

Referring to the drawings in detail, there is shown a shelter which generally comprises a main tank 10, a chamber 11 and an entrance and exit tube 12.

The tank 10, as shown, is generally cylindrical and has shallow dished end walls 14 one of which is formed with an opening or doorway 15. This tank is constructed of metal, such as ferrous metals ordinarily used for tank structures, which is heat conductive, whereby the body heat of human beings seeking refuge therein is readily transferred to the ground. The tank is weatherproof, and is designed to withstand an earth load of about 230 pounds per square foot and a static load of about 500 pounds per square foot (total load 730 pounds per square foot) whereby the tank can be buried more than about two feet underground so that the earth covering and surrounding the same shields the tank against nuclear radiations and protects the same against blast.

A concrete foundation 16 is poured into the excavation for the tank 10 (Fig. 2) to which the tank is secured by stay bolts 17 embedded in the concrete and fastened to lugs 18 on the exterior of the tank by nuts 19 (Fig. 4). This foundation anchors the tank into the ground to prevent dislodgement thereof by the buoyant effects of subterranean seepages or such water tables as normally encountered. If desired, suitable saddle or cradle means (not shown) may be utilized for mounting the tank on the foundation.

Preferably, the tank 10 is provided with a series of annular members 20, such as channelled or angled rings, spaced lengthwise at the interior thereof. These rings reinforce the cylindrical wall of the tank whereby this wall may be constructed of thinner metal to effect an advantageous reduction in weight and cost and an increase in heat conductivity. These rings also provide structure to which the furnishings and equipment within the tank can be readily secured.

The chamber 11 has one end secured to the end wall of the tank 10 about the opening 15 and extends outwardly therefrom and is closed at its other end by a wall 21 (Fig. 4). This chamber preferably is generally tubular, and is oval in cross-section, with its major axis in a vertical plane, to provide a maximum of head room for persons passing therethrough. A door 22, opening into the tank 10, is provided for the opening 15 to shut off the tank 10 from the chamber 11.

The tube 12, as shown herein, may have the same cross-section as the chamber 11, and has its lower end secured in an opening at the top of the chamber. The tube extends upwardly to the ground level or slightly above it with its upper end exposed to provide a manhole for the reception of a cover 23, preferably of light weight construction to facilitate removal and replacement, and fitting the tube loosely at its edges in nonsealing relation.

The tube 12 preferably is inclined to facilitate ascent and descent therein, for example towards the main tank 10 so that it is entirely above the chamber 11 to thereby minimize the size of the excavation required to bury the shelter. Ladder means, such as rungs 24 are provided on the lower side of the tube 12 and on one side of the chamber 11. Another and important feature of this arrangement is that the passageway leading to the door 22 is more or less staggered or labyrinth, whereby harmful radiations entering the tube 12 and reflections thereof are directed away from the tank 10. Also, a space of several feet is provided between the door 22 and the lower end of the tube, whereby a shield of earth having a depth of at least several feed is disposed between the tube and the tank to block any harmful radiations entering the tube and reflected therein towards the tank.

The chamber 11, the tube 12 and the cover 23 are constructed of metal such as the type of which the tank 10 is made to provide an iron-clad labyrinth.

In order to insure an adequate supply of fresh air for the tank 10, a ventilating system is provided which includes a conduit 25 extending from the tank 10 to the atmosphere, a fan 26 or other type of air mover for drawing air from the atmosphere through the conduit into the tank, and a filter 27 in the conduit adjacent the upper end thereof for removin dust and radioactive particles from the air drawn into the tank. Stale air is forced out of the tank through unsealed spaces between the doorway 15 and the door 22, the chamber 11, the tube 12 and through the space between the cover 23 and the tube 12. As shown, the conduit 25 is at the end opposite the doorway end to provide for better circulation of fresh air through the tank.

Alternatively, a fan 28 may be mounted on a hinged support such as the door 22 to position this fan in the doorway 15 when in use and to move it aside to enable persons to pass through the doorway. This fan is arranged to draw air out of the tank, whereby filtered fresh air flows into the tank through the conduit 25.

The fans 26 and 28 are normally driven by electric motors which are powered by a power package (not shown) buried in the ground adjacent the shelter. Should the fan motors or the power package fail, provision is made for operating the fan 28 by a hand-powered crank unit 29 which enables the fan to be rotated at a speed to ventilate the tank sufficiently to enable its occupants to survive.

In order to provide for motor or hand powered fan operation, the filter 27 is of the type which has an adequate efficiency at high air flow and has a low air resistance at low air flow.

An electric lighting system (not shown) is installed in the tank including illuminating units of the low heat emanating type which receive electricity from the power package.

The tank 10 is further provided with an emergency exit opening 30 at the top thereof which normally is sealed by a closure 31 removably attached to the interior of the tank. Should the chamber 11 and/or the tube 12 be rendered inaccessible or be otherwise blocked, an occupant within the tank can remove the closure 31 from the interior and dig through the earth above the opening 30 to escape from the tank.

The tank 10 is rendered more livable by providing a floor 32 at about the level of the base of the doorway 15, a chemical toilet 33 (Figs. 1 and 2) vented to the chamber 11 and the tube 12 (not shown), and bunks serving as seats and sleeping accommodations. The space 13 beneath the floor serves as a moisture trap for condensate formed in the tank and may contain moisture absorbing material such as silica aerogel and the like, desiccants or mixtures of such materials. Alternatively, such material may be sand, gravel or broken stone or mixture thereof, preferably in dry condition. These materials, in addition to having some moisture absorbing properties, have the function of serving to weight down the tank and anchor the same underground, whereby the anchoring foundation 16 is not required.

In an illustrative embodiment of the invention, five bunks are provided with one at the end opposite the door 22 and two at each side of the tank one above the other. The bunks comprise a mattress supporting board or frame 34 hinged to brackets 35 secured to the rings 20 of the tank in a manner to fold them into a substantially vertical position when not in use to establish more space in the tank. The end bunk and the lower side bunks are arranged to fold upwardly, and the upper side bunks are arranged to fold downwardly (Fig. 3) in overlapping relation with their adjacent lower bunk. While not shown herein, suitable means are provided for supporting the bunks in horizontal position when in use. The side bunks serve the additional purpose of enabling a person to climb up thereon to gain access to the emergency exit.

The shelter is further equipped with tools, bedding, rations, a clock, a radio (with external antenna), reading material, and a radiation counter for determining when it is safe to leave the shelter.

The shelter is fully furnished and equipped at the factory, whereby it can be delivered complete for immediate placement into the ground to reduce the installation time to a minimum. A factory certification is given to the purchaser assuring that the shelter has been inspected and tested for completeness and safety. Also, the shelter shown herein preferably is of such shape and dimensions, for example eight feet in diameter and sixteen feet in length, to enable the same to be shipped over highways or by rail without special permits, precautions or procedures, but yet is sufficiently roomy to accommodate five persons.

From the foregoing description it will be seen that the present invention provides a simple, practical and economical shelter adapted to fully protect human beings against atomic attacks while affording considerable comfort during long periods of refuge therein.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:
1. A shelter in which human beings can survive the heat of atomic explosions and are protected against nuclear radiations resulting from fall out, said shelter comprising a heat conductive cylindrical tank constructed and arranged for burying and anchoring the same underground a sufficient distance to shield the same from heat and nuclear radiations and for withstanding the blast of a nearby atomic explosion, said tank having an opening in one end wall thereof constructed and arranged to enable a person to pass therethrough; a first tube extend- ing longitudinally outwardly from said end wall formed with said opening having a closed end and an open end in communication with said opening and having an upwardly facing opening between its ends; a second tube having its lower end in communication with said upwardly facing opening and being inclined toward said tank and upwardly with respect to the longitudinal axis of said first tube and having its upper end at about ground level to provide a manhole for entering and leaving the tank; a removable cover for said manhole; a conduit adjacent the other end wall of said tank extending upwardly from said tank to the atmosphere; means for supplying atmospheric air through said conduit to said tank; and filter means for removing radioactive particles from the supplied air.

2. A shelter according to claim 1, including a fan and a hinged support for mounting said fan in said tank opening.

3. A shelter according to claim 2, wherein said hinged support is a door.

4. A shelter according to claim 2, wherein said fan includes a handle at the interior side of said opening for operating said fan by hand.

References Cited in the file of this patent

UNITED STATES PATENTS

| | | |
|---|---|---|
| 278,354 | Miller | May 29, 1883 |
| 1,503,958 | McCampbell | Aug. 5, 1924 |
| 2,729,966 | Lutteke | Jan. 10, 1956 |

FOREIGN PATENTS

| | | |
|---|---|---|
| 375,837 | Italy | Oct. 24, 1939 |
| 410,584 | Italy | Apr. 17, 1945 |
| 478,671 | Great Britain | Jan. 24, 1938 |
| 482,542 | Great Britain | Mar. 31, 1938 |
| 518,742 | Great Britain | Mar. 6, 1940 |
| 520,326 | Great Britain | Apr. 19, 1940 |
| 540,995 | Great Britain | Nov. 7, 1941 |
| 741,791 | France | Dec. 13, 1932 |
| 829,312 | France | Mar. 28, 1938 |
| 852,339 | France | Jan. 30, 1940 |

OTHER REFERENCES

Prentiss: Popular Science, May 1941, pp. 77, 78 and 79.